United States Patent
Molnar et al.

(10) Patent No.: US 8,987,346 B2
(45) Date of Patent: Mar. 24, 2015

(54) HIGH SOLIDS CROSS-LINKED ETHYLENE PROPYLENE DIENE TERPOLYMER LATEX

(71) Applicant: Lion Copolymer Geismar, LLC, Geismar, LA (US)

(72) Inventors: Michael J. Molnar, Baton Rouge, LA (US); George A. Von Bodungen, Baton Rouge, LA (US); Subir Debnath, Baton Rouge, LA (US); Harold William Young, Jr., Baton Rouge, LA (US); Zhiyong Zhu, Baton Rouge, LA (US)

(73) Assignee: Lion Copolymer Geismar, LLC, Geismar, LA (US)

( * ) Notice: Subject to any disclaimer, the term of this patent is extended or adjusted under 35 U.S.C. 154(b) by 0 days.

(21) Appl. No.: 14/228,163

(22) Filed: Mar. 27, 2014

(65) Prior Publication Data

US 2014/0378574 A1 Dec. 25, 2014

Related U.S. Application Data

(60) Provisional application No. 61/829,961, filed on May 31, 2013, provisional application No. 61/829,971, filed on May 31, 2013, provisional application No. 61/829,975, filed on May 31, 2013.

(51) Int. Cl.
| | | |
|---|---|---|
| *C08K 5/42* | (2006.01) | |
| *C08K 5/14* | (2006.01) | |
| *C08K 13/02* | (2006.01) | |
| *C08K 3/20* | (2006.01) | |
| *C09J 123/14* | (2006.01) | |
| *C09D 145/00* | (2006.01) | |
| *C09D 123/14* | (2006.01) | |
| *C08L 23/08* | (2006.01) | |
| *C09J 145/00* | (2006.01) | |

(52) U.S. Cl.
CPC ... *C08K 5/42* (2013.01); *C08K 3/20* (2013.01); *C08K 5/14* (2013.01); *C08K 13/02* (2013.01); *C08L 23/08* (2013.01); *C09D 145/00* (2013.01); *C09D 123/145* (2013.01); *C09J 145/00* (2013.01); *C09J 123/145* (2013.01)
USPC ............... 523/122; 524/47; 524/83; 524/386; 524/499; 524/502

(58) Field of Classification Search
CPC .......... C08K 5/42; C08K 13/02; C08K 23/08; C08K 145/00; C08K 123/145
USPC ............... 523/122; 524/47, 83, 386, 499, 502
See application file for complete search history.

(56) References Cited

U.S. PATENT DOCUMENTS

| | | |
|---|---|---|
| 3,894,978 A | 7/1975 | Montesissa et al. |
| 3,979,346 A | 9/1976 | Zuckert et al. |
| 4,299,742 A | 11/1981 | Belder et al. |
| 4,301,048 A | 11/1981 | Hirayama et al. |
| 4,497,933 A | 2/1985 | Gorzinski et al. |
| 5,985,953 A | 11/1999 | Lightsey et al. |
| 6,111,007 A * | 8/2000 | Rosenbaum et al. ......... 524/461 |
| 8,357,733 B2 | 1/2013 | Wallen et al. |

* cited by examiner

*Primary Examiner* — Kriellion Sanders
(74) *Attorney, Agent, or Firm* — Buskop Law Group, PC; Wendy Buskop

(57) ABSTRACT

A high solids cross-linked ethylene propylene diene terpolymer latex consisting of 15 weight percent to 88 weight percent ethylene propylene diene terpolymer with a molecular weight from 1300000 Mw to 5000 Mw, 10 weight percent to 70 weight percent of a water, 1 weight percent to 15 weight percent of a surfactant, and 0.3 weight percent to 1.76 weight percent of a curative.

19 Claims, 3 Drawing Sheets

*FIGURE 1*

Examples Group 1

| Materials | Function | Source | 2 Pound | 3 Pound | 4 Pound |
|---|---|---|---|---|---|
| Royalene® 360 | EPDM Polymer | Lion Copolymer, LLC | 15 | 50 | 70 |
| Cement conc. | | | 8% | 8% | 8% |
| DI Water | | | 54.5 | 29 | 18.5 |
| Efka® 6225 | Dispersing surfactant | BASF | 30.2 | 20 | 10 |
| Trigonox® 101 | Curing agent | AkzoNobel | 0.3 | 1 | 1.5 |
| | | Total (pound) | 100.0 | 100.0 | 100.0 |
| | | Total Solid (%) | 46% | 71% | 82% |
| | | Crosslinking extent | 45% | 85% | 100% |

*FIGURE 2*

Examples Group 2

| Materials | Function | Source | 5 Pound | 6 Pound | 7 Pound |
|---|---|---|---|---|---|
| Royalene® 511 | EPDM Polymer | Lion Copolymer, LLC | 88 | 70 | 50 |
| Cement conc. | | | 4% | 8% | 50% |
| DI Water | | | 10.1 | 27.7 | 47.2 |
| Nuosperse FA 607 | Dispersing surfactant | Elementis | 1 | 1 | 1 |
| Accelerator TMTD | Curing accelerator | AkroChem | 0.3 | 0.4 | 0.56 |
| (RM) Sulfur | Curing agent | AkroChem | 0.6 | 0.9 | 1.2 |
| | | Total (pound) | 100.0 | 100.0 | 100.0 |
| | | Total Solid (%) | 90% | 72% | 53% |
| | | Crosslinking extent | 50% | 85% | 98% |

*FIGURE 3*

Examples Group 3

| Materials | Function | Source | 8 Pound | 9 Pound | 10 Pound |
|---|---|---|---|---|---|
| Royalene® 535 | EPDM Polymer | Lion Copolymer, LLC | 26 | 50 | 70 |
| Cement conc. | | | 8% | 8% | 8% |
| DI Water | | | 70.1 | 42.7 | 18.2 |
| Zonyl® FSA | Dispersing surfactant | Dupont | 3 | 6 | 10 |
| Accelerator TMTD | Curing accelerator | AkroChem | 0.3 | 0.4 | 0.56 |
| (RM) Sulfur | Curing agent | AkroChem | 0.6 | 0.9 | 1.2 |
| | | Total (pound) | 100.0 | 100.0 | 100.0 |
| | | Total Solid (%) | 30% | 57% | 82% |
| | | Crosslinking extent | 60% | 65% | 65% |

FIGURE 4

| Examples Group 4 | | | 11 | 12 | 13 | 14 | 15 | 16 | 17 | 18 |
|---|---|---|---|---|---|---|---|---|---|---|
| Materials | Function | Source | Pound | Pound | Pound | Pound | Pound | Pound | Pound | Pound |
| Royalene® 511 | EPDM Polymer | Lion Copolymer, LLC | 50 | 50 | 50 | 50 | 40 | 40 | 40 | 40 |
| Cement conc. | | | 8% | 8% | 8% | 8% | 8% | 8% | 8% | 8% |
| DI Water | | | 46.16 | 45.06 | 36.15 | 10.96 | 35.66 | 35.66 | 40.56 | 13.46 |
| Nuosperse FA 607 | Dispersing surfactant | Elementis | 1 | 1 | 2 | 2 | 4 | 4 | 4 | 4 |
| Accelerator TMTD | Curing accelerator | AkroChem | 0.56 | 0.56 | 0.56 | 0.56 | 0.56 | 0.56 | 0.56 | 0.56 |
| (RM) Sulfur | Curing agent | AkroChem | 1.2 | 1.2 | 1.2 | 1.2 | 1.2 | 1.2 | 1.2 | 1.2 |
| CELLOSIZE™ ER 30M | Anti-settling agent | Dow Chemicals | 1 | 2 | 5 | 5 | 8 | 8 | 8 | 10 |
| Protectol® DZ | Biocide | BASF | | 0.1 | | | | | | 0.2 |
| Byk® -021 | Defoamer | BYK | | | 0.01 | 0.2 | 0.5 | 0.5 | 0.5 | 0.5 |
| RP 9405 Talc | Filler | Cimbar | | | 5 | | 5 | 5 | 5 | |
| Hi-Sil 135 | Filler | PPG Industries | | | | 30 | | | | 20 |
| Tioxide TR23 | Filler and pigment | Huntsman | | | | | 5 | | | |
| Regal® 300 | Filler and pigment | Cabot | | | | | | 5 | | |
| Synthetic Red oxide | Pigment | Unilex | | | | | | | 0.1 | 10 |
| | | Total (pound) | 100 | 100 | 100 | 100 | 100 | 100 | 100 | 100 |
| | | Total Solid (%) | 54% | 55% | 64% | 89% | 64% | 64% | 59% | 87% |
| | | Crosslinking extent | 80% | 80% | 80% | 80% | 85% | 85% | 85% | 85% |

HIGH SOLIDS CROSS-LINKED ETHYLENE PROPYLENE DIENE TERPOLYMER LATEX

CROSS REFERENCE TO RELATED APPLICATIONS

The present application claims priority to and the benefit of U.S. Provisional Patent Application Ser. No. 61/829,961 filed on May 31, 2013, entitled "METHOD FOR MAKING A HIGH SOLIDS CROSS-LINKED ETHYLENE PROPYLENE DIENE MONOMER LATEX"; U.S. Provisional Patent Application Ser. No. 61/829,971 filed on May 31, 2013, entitled "HIGH SOLIDS CROSS-LINKED ETHYLENE PROPYLENE DIENE MONOMER LATEX"; and U.S. Provisional Patent Application Ser. No. 61/829,975 filed on May 31, 2013, entitled "CROSS-LINKED ETHYLENE PROPYLENE DIENE LATEX BLENDS FOR IMPROVED COATINGS". These references are hereby incorporated in their entirety.

FIELD

The present embodiments generally relate to a stable cross-linked ethylene propylene diene terpolymer latex formulation usable for making molded gloves, adhesives, and coatings.

BACKGROUND

A need exists for a water based formulation that allows building owners to have a low cost moisture barrier on many parts of the building envelope that will help reduce mold build up in buildings.

A need exists for a water based formulation with easy clean up and fast cure.

A need exists for a water based moisture barrier formulation that when hardened will lower the energy loss and reduce the demand for energy in buildings.

A need exists for a water based surface treatment formulation that will be long lasting, reducing the demand for foreign oil and can easily be blended into adhesives or paints without separation and a long shelf life of over 180 days without separation.

A need exists for a water based formulation that will have low volatile organic compounds (VOC) to help protect the workers and the atmosphere during application of the latex formulation to a substrate.

The present embodiments meet these needs.

BRIEF DESCRIPTION OF THE FIGURES

The detailed description will be better understood in conjunction with the accompanying drawings as follows:

FIG. 1 is additional information relative to examples 2-4 according to the embodiments.

FIG. 2 is additional information relative to examples 5-7 according to the embodiments.

FIG. 3 is additional information relative to examples 8-10 according to the embodiments.

FIG. 4 is additional information relative to examples 11-18 according to the embodiments.

The present embodiments are detailed below with reference to the listed Figures.

DETAILED DESCRIPTION OF THE EMBODIMENTS

Before explaining the present formulation in detail, it is to be understood that the formulation not limited to the particular embodiments and that it can be practiced or carried out in various ways.

The invention relates to a cross-linked ethylene propylene diene terpolymer latex with a customer specified solids content from 30 weight percent to 60 weight percent based on the total weight of the latex.

The following definitions are used herein.

The term "cured latex" refers to the cross-linked final EPDM formulation.

The term "EPDM" refers to ethylene propylene diene terpolymers. These EPDM have no double bonds in the backbone of the polymer chains and, thus, are less sensitive to oxygen and ozone and have high UV-resistance. In EPDM, the ethylene and propylene comonomers form a saturated polymer backbone with randomly distributed, non-conjugated diene monomers, which provide unsaturations attached to the main chain.

The term "high shear" relates to the use of a high shear mixer. High shear is mixing at greater than 1000 revolutions per minute.

The term "high solids" refers to the total resulting formulation having at least 30 weight percent solids and up to 80 weight percent, as measured by ASTM D 1417-10 for synthetic rubber lattices.

The term "latex" refers to polymers dispersed in water with or without additional solvent.

The term "minimal frothing" refers to an event upon mixing which adds air bubbles to less than 10 percent of the entire latex by volume. The unique formation of this invention is believed to have reduced bubble content, or "minimal frothing" when mixing at a high shear rate due the surface tension properties of the latex which is created by the combination of physical network junctions including temporary and trapped entanglements of chains formed with the aid of the surfactant.

The phrase "percent cross-linked" refers to the density of the cross-links formed in the resulting formulation. A percent cross-linked can be calculated by using the percent solubility of the polymer of the latex in toluene indicating the "relative cross-linking" of the polymer.

The term "surfactant" refers to a detergent or a dispersant. In embodiments, the surfactant can double as a wetting agent.

The term "water" refers to deionized water, tap water, distilled water, process water or combinations thereof.

The cross-linked ethylene propylene diene terpolymer latex uses 15 weight percent to 88 weight percent of a premixed ethylene propylene diene terpolymer component in 50 weight percent to 96 weight percent of a solvent.

The premixed terpolymer component has a molecular weight from 1300000 Mw to 5000 Mw.

The premixed terpolymer component has 4 weight percent to 50 weight percent of random covalently linked monomers of ethylene and propylene having weight ratios from 40:60 to 85:15 of ethylene:propylene respectively.

The premixed terpolymer component has 0.25 weight percent to 15 weight percent of the polymer component is a non-conjugated diene;

The premixed liquid ethylene propylene diene terpolymer (EPDM) component is sometimes referenced herein and in industry usage as "EPDM cement", "EPDM starting material" or "premixed liquid ethylene propylene diene terpolymer component" or "premixed liquid EPDM component." In embodiments, a dry rubber starting material can be used that is then mixed with a solvent to create the premixed liquid ethylene propylene diene terpolymer component.

This premixed liquid EPDM component can contain 4 weight percent to 50 weight percent of dry ethylene/propylene polymers with molecular weights from 1300000 Mw to 5000 Mw. Molecular weights from 10000 Mw to 600000 Mw are also considered useful herein. Molecular weights that are from 5000 Mw to 80000 Mw are also useful.

The polymer has random covalently linked monomers of ethylene and propylene covalently connected to diene.

The non-conjugated diene comprises at least one of methylidene norbornene, dicyclopentadiene, ethylidene norbornene, and 1,4-hexadiene, vinyl norbornene.

The premixed liquid EPDM component can include 50 weight percent to 96 weight percent of a solvent. The solvent can be hexane, xylenes, naphtha, isopar, mineral spirits, toluene, and another hydrocarbon solvent capable of dissolving ethylene propylene diene terpolymer.

The premixed liquid EPDM component is blended into 10 weight percent to 70 weight percent of a water.

The water can be distilled water, deionized water, tap water, process water, and combinations thereof.

Into the EPDM component in water is blended 1 weight percent to 30 weight percent of a surfactant.

The premixed liquid EPDM component can be blended with 1 weight percent to 15 weight percent of a surfactant. The surfactant can be cationic surfactant, anionic surfactant, non-ionic surfactant, or combinations thereof.

The surfactant can be a tetra-octyl ammonium chloride, a sulfo-succinate, a carboxylates, polyoxyethylene sorbates, cetyl ammonium chloride, sodium alkyl benzyl sulfonate, sodium lauryl sulfate, potassium lauryl sulfate, ammonium lauryl sulfate, rosin acids, tallow fatty acids, polyethylene stearyl ethers, perfluoro butane sulfonic acid, alkyl naphthalene sulfonate, or combinations thereof.

The mixing of these three ingredients can be performed for 1 minute to 30 minutes at atmospheric pressure to form an intermediate latex with minimum frothing.

After mixing, at least a portion of at least one of: a sulfur donative curative and a free radical generating curative are added to the above ingredients.

The portion of curative is within a weight percent from 0.3 weight percent to 1.76 weight percent of a total amount of curative used in the formulation.

In embodiments, the curative can be a peroxide, a hydroperoxide, peroxy-carbonate, thiuram, thiazole, dithiocarbamate, xanthate, sulfenamide, sulfur, phenolic resins, benzothiazole, and combinations of these curatives.

The ingredients are then mixed together, forming a cross-linked ethylene propylene diene terpolymer miscible with acrylic, urethane, alkyd, and epoxy lattices.

The mixed ingredients of the formulation are then heated to form a partially cross-linked polymer formulation.

If the partially cross-linked formulation has a cross link density less than 50 percent when at least 99 percent of the water is removed from the latex as determined by ASTM test D3616 effective 2014, additional portions of the same curative or a portion of a different curative of the same list of curatives can be added to the formulation.

After the second portion of curative is added, the formulation is then heated a second time forming a dehydrated latex which when applied to a substrate, exhibits: a glass transition temperature of −50 degrees Celsius to −40 degrees Celsius; an impact resistance as measured by a falling dart test that has less than a 50 percent failure at 20 inch-pound at an ambient temperature; a moisture barrier of less than 1.0 perm unit as determined by ASTM D 1735 effective 2014 preventing penetration of water to a substrate; and providing a color change of delta E of less than 5 as measured by the accelerated weathering tests ASTM G 154 and ASTM D 3632 both with effective dates of 2014 and at least a 50 percent cross-linked density.

In embodiments, the sulfur curative can include accelerators or catalysts in the total curative weight percent. Zinc diethyldithiocarbamate can be used as an accelerator. Zinc benzothiozole can be used as a catalyst herein. In embodiments, from 10 weight percent to 90 weight percent of the curative can be the accelerator, the catalyst or combinations of the two.

In embodiments, the first heat may range at temperatures ranging from 60 degrees Celsius to 100 degrees Celsius for a duration from 10 minutes to 24 hours.

In embodiments the first heating is under a vacuum to remove 95 weight percent to 99 weight percent of the solvent while simultaneously cross-linking the latex at least 50 percent, forming the partially cross-linked latex.

In embodiments, at least 80 percent of the polymer can be cross-linked after the first heating depending on the curative used. In other embodiments, 100 percent cross-linking can be achieved in the first heating.

Embodiments contemplate that a second heat can be applied to the partially cross-linked latex to remove 1 percent to 95 percent of the water remaining in the latex.

The second heat can be applied using a temperature ranging from 60 degrees Celsius to 100 degrees Celsius. The second heating can be applied for time periods ranging from 10 minutes to 2 days.

In embodiments, the second heating can be performed under vacuum forming a high solids, high percentage cross-linked ethylene propylene diene terpolymer latex with 30 weight percent to 60 weight percent polymer dispersed in water.

The formulation can save 70 percent of the energy typically used in forming EPDM coatings and helps conserve the planet, providing a highly cross-linked EPDM product with a significantly lower carbon footprint.

These EPDM lattices, when used as additives in paints and outdoor coatings, such as roofing materials, are expected to provide a long lived coating, lasting for up to 10 years, while being additionally environmentally friendly by not releasing volatile organic compounds (VOC) into the atmosphere during application.

This formulation is usable in roofing materials, concrete sealants, bridge paint or similar items.

The present embodiments relate to a high solids cross-linked ethylene propylene diene terpolymer latex usable to create adhesives with provide a dual properties of adhesion and water proof barriers by forming a polymer matrix with small non conjugated diene components in a larger ethylene propylene framework.

The final high solids cross-linked ethylene propylene diene terpolymer latex can be a volatile organic component free formulation.

The high solids cross-linked ethylene propylene diene terpolymer latex can produce low, such as less than 50 g/L emissions on curing, which improves the health of workers applying the coating to a substrate, such as a house, or a boat.

The final high solids cross-linked ethylene propylene diene terpolymer latex is easy to handle and apply to a substrate, and has an easy flowability at temperatures ranging from 1 degree Celsius to 50 degrees Celsius.

The formulation can be a low VOC formulation (less than 250 g/L) suitable for use in volatile organic component (VOC) regulated markets with a latex water based system. It can provide excellent adhesion to a variety of substrates, including EPDM membranes, EPDM coatings, metals, wood, and concrete.

The formulation can be suitable for a wide variety of applications and provide resistance to moisture once dried.

The flowable final formulation once applied and then dried is expected to provide resistance to shrinkage and cracking.

It is expected that the final latex can be stored in unopened packaging at temperatures ranging from 1 degree Celsius to 50 degrees Celsius and have a shelf life of about 12 months when stored as recommended. In embodiments of the formulation that include a biocide, the shelf life can be 24 months.

In embodiments, the latex can be white, clear, opaque, or colored with a pigment, such as carbon black.

The cross-linked ethylene propylene diene terpolymer latex in embodiments can contain from 0.1 weight percent to 20 weight percent of a pigment, wherein the pigment is selected from the group: a dye, carbon black, and metal oxide.

Embodiments of the formulation can include a defoaming agent that is added prior to mixing to form the intermediate latex or after the mixing to form the intermediate latex.

In embodiments, the defoaming agent can be selected from the group: a poly-dimethyl siloxane, a poly-dimethyl siloxane with finely divided silica, such as a DOW CORNING® 1500, or combinations thereof. DOW CORNING® Antifoam 1430 and BYK 021 defoamer of BYK-Chemie GmBh can also be used herein.

The cross-linked ethylene propylene diene terpolymer latex in embodiments has 0.01 to 0.5 weight percent defoaming agent. The defoaming agents can also be a petroleum distillate based agents or a combinations of the listed defoaming agents.

The formulation can be produced with low shear mixing, but in embodiments, the first mixing can be a high shear mixing and can be performed using a high shear mixer.

Embodiments of the formulation can include using 1 weight percent to 10 weight percent of an anti-settling stabilizer before removing the water from the blended EPDM.

The anti-settling stabilizer is a hydroxyethyl cellulose, a glycerin, a hydrophobically modified alkali soluble acrylic emulsion, such as those available from The Dow Chemical Company and known as ACRYSOL® RM-5.

The antisettling stabilizer can be a poly-ether urea polyurethane such as the product RHEOLATE® 210 from Elementis Specialties.

Other usable anti-settling stabilizers include polyester of glycerin and isophthalic acid or linoleic acid, and combinations thereof.

Embodiments can include using 0.1 weight percent to 0.2 weight percent of a biocide in the formulation. The weight percent of the biocide is based on the total weight of the formulation.

The biocide can be benzisothiazolinone, 3,5-Dimethyl-2H-1,3,5-thiadiazinane-2-thione biocide, 4,5 dichloro-2-n-octyl-isothazonline-3-one such as those available from Rohm and Haas Company as ROZONE® 2000, or combinations thereof.

A usable biocide can be benzisothiazolinone, such as BIO-BIT® 20 available from The Dow Chemical Company. The biocide can be antimicrobial, providing antibacterial and antifungal protection. Another usable biocide can be a PROTECTOL® available from BASF.

Embodiments of the formulation can include using 5 weight percent to 30 weight percent of a filler selected from the group: a silica, a talc, a starch, carbon black, or combinations thereof.

In embodiments, the cross-linked ethylene propylene diene terpolymer latex can have as the preset limit for the crosslink density is 30 percent of the terpolymer.

In embodiments, disposable soft molded gloves for chemical resistant applications can be made from the formulation.

In embodiments, an adhesive can be made comprising 50 weight percent to 80 weight percent of the formulation.

In embodiments, the formulation can create a coating which can be usable for raincoats, tents, tarps, chemical plant roofs, chemical plant walls, storage tank exteriors, exteriors of transportation vehicles, and conveyor belts.

When used as a coating, the latex formulation is expected to seal the exposed edges of roof systems, including splices, T-joints, stepdowns, tie-ins, termination bars, and general flashing details.

The formed cross-linked EPDM can have a dynamic tensile modulus greater than non-cross-linked polymers of ethylene propylene monomers (EPM). The higher the cross-linking the more improved the dynamic tensile modulus.

This final formulation can have an improved tensile modulus of 50 percent to 500 percent increased tensile modulus as compared to a non-cross-linked EPDM.

The final formulation, once dried, can have better solvent resistance than a less cross-linked or non-cross-linked EPDM, by at least 2 percent.

The final product can dry in the presence of air, forming a solid surface in less than 72 hours.

When the formulation dries, it is expected that the cured material will have a long life, and significant toughness due to the cross-linking of the polymer.

Cross-linking is initiated by the thermal decomposition of the peroxide. Next, the active radicals thus formed abstract hydrogen from the polymer chains to form macro-radicals. Finally, cross-linking results either from the combination of two macro-radicals or from the addition of a macro-radical to an unsaturated moiety of another primary elastomer chain.

It is theorized that this particular latex of EPDM can form temporary and trapped entanglements and provide dangling chains, and chain loops that create differences in the distribution of the cross-links creating the advantageous physical properties, of long life, and high density of molecules in a matrix, which provides the improved toughness over other formulations.

The chemical conversion rates, the amount of cross-linking, and chemistry of the bonds, optical spectroscopy, high-resolution NMR, titration of non-reacted functional groups can be used to show the benefits of the invention. The spectroscopic methods are particularly useful for quantitative analysis of cross-links.

Embodiments of the formulation can include using a surfactant selected from the group: cationic surfactants, anionic surfactants, non-ionic surfactants or combinations thereof.

Example 1

A hexane solution containing 8 weight percent solid ROYALENE® 525 polymer was the premixed liquid EPDM component. ROYALENE® 525 has a 60:40 ethylene:propylene ratio and 8.09 weight percent ethylidene norbornene (ENB).

In this embodiment, 30 grams of the premixed liquid EPDM component was mixed with 60 grams of deionized water and 10.7 grams of a surfactant known as OT-75% which is a sulfosuccinate with 75 percent solids available from Cytec Industries, Inc.

The mixing occurred at 20,000 rpm for 1 minute using a Wiggen Hauser D-500 Shear Power Homogenizer at atmospheric pressure.

This high shear mixing was followed by repeated passes on a GEA Niro Soavi High Pressure Homogenizer known as the PANDA® 2K set at 500 bar until a uniform mixture was formed.

The uniform mixture was then charged with two drops of DOW CORNING® Antifoam 1500 using a plastic disposable dropper into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 0.5 grams of peroxide curative VULCUP® available from Arkema, Inc. was added to form a partially cross-linked latex in the same azeotropic distillation apparatus. The mixture was refluxed under partial vacuum at 60 degrees Celsius until 50 weight percent solids latex was obtained with a 70 percent relative cross-linking.

Expected Physical Properties and Characteristics for the final latex of Example 1:

|  | Typical Values | Test Method |
| --- | --- | --- |
| FINAL FORMULATION | | |
| Color | White | Visual |
| Specific Gravity | 1.02 | ASTM D 1475 |
| Brookfield Viscosity | 32 cps | ASTM D 2196 |
| VOC Content | <50 g/L | ASTM D 2369 |
| Solids Content | 50% | ASTM C 681 |
| Flash Point (open cup) | In excess of 90 degrees Centigrade | ASTM D 56 |
| Application Properties | | |
| Service Temperature | −50° C. to 100° C. | ASTM D 3359 |
| Application Temp | 1° C. to 50° C. | ASTM C 603 |

Turning now to the Figures, FIG. 1 contains additional information relative to Examples 2-4.

Example 2

A hexane solution containing 8 weight percent solid ROYALENE® 360 polymer was the premixed liquid EPDM component. ROYALENE® 360 has a 52:48 ethylene:propylene ratio and 2 weight percent dicyclopentadiene (DCPD).

187.5 grams of the premixed liquid EPDM component was mixed with 54.5 grams of deionized water and 30.2 grams of a fatty acid modified polyester surfactant, which is EFKA® 6225 from BASF in this example.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 0.3 grams of peroxide curative 5-bis(tert-butylperoxy)-2,5-dimethylhexane (TRIGONOX® 101 from AkzoNobel) was added to form a partially cross-linked latex in the same azeotropic distillation apparatus. The mixture was refluxed under partial vacuum at 60 degrees Celsius until 46 weight percent solids latex was obtained with a 45 percent relative cross-linking.

Example 3

A hexane solution containing 8 weight percent solid ROYALENE® 360 polymer was the premixed liquid EPDM component. ROYALENE® 360 has a 52:48 ethylene:propylene ratio and 2 weight percent dicyclopentadiene (DCPD).

In embodiments, 625 grams of the premixed liquid EPDM component was mixed with 29 grams of deionized water and 20 grams of a fatty acid modified polyester surfactant, which was EFKA® 6225 from BASF.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.0 grams of peroxide curative 5-bis(tert-butylperoxy)-2,5-dimethylhexane (TRIGONOX® 101 from AkzoNobel) was added to form a partially cross-linked latex in the same azeotropic distillation apparatus. The mixture was refluxed under partial vacuum at 60 degrees Celsius until 71 weight percent solids latex was obtained with an 85 percent relative cross-linking.

Example 4

A hexane solution containing 8 weight percent solid ROYALENE® 360 polymer was the premixed liquid EPDM component. ROYALENE® 360 has a 52:48 ethylene:propylene ratio and 2 weight percent dicyclopentadiene (DCPD).

In this embodiment, 875 grams of the premixed liquid EPDM component was mixed with 18.5 grams of deionized water and 10 grams of a fatty acid modified polyester surfactant, which was EFKA® 6225 from BASF.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.5 grams of peroxide curative 5-bis(tert-butylperoxy)-2,5-dimethylhexane (TRIGONOX® 101 from AkzoNobel) was added to form a partially cross-linked latex in the same azeotropic distillation apparatus. The mixture was refluxed under partial vacuum at 60 degrees Celsius until 82 weight percent solids latex was obtained with a 100 percent relative cross-linking.

FIG. 2 contains additional information relative to Examples 5-7.

Example 5

A hexane solution containing 4 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 2200 grams of the premixed liquid EPDM component was mixed with 10.1 grams of deionized water and 1.0 grams of fatty amine ethoxylated salt surfactant, such as NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the Panda 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 0.6 grams of sulfur curative, which was RM Sulfur available from AkroChem Corporation, and 0.3 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 60 degrees Celsius until 90 weight percent solids latex was obtained with a 50 percent relative cross-linking.

Example 6

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 875 grams of the premixed liquid EPDM component was mixed with 27.7 grams of deionized water and 1.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 0.9 grams of sulfur curative, which was RM Sulfur available from AkroChem Corporation, and 0.4 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 72 weight percent solids latex was obtained with an 85 percent relative cross-linking.

Example 7

A hexane solution containing 50 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 100 grams of the premixed liquid EPDM component was mixed with 47.2 grams of deionized water and 1.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation and 0.56 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 53 weight percent solids latex was obtained with a 98 percent relative cross-linking.

FIG. 3 contains additional information relative to Examples 8-10.

Example 8

A hexane solution containing 8 weight percent solid ROYALENE® 535 polymer was the premixed liquid EPDM component. ROYALENE® 511 has a 60:40 ethylene:propylene ratio and 9.4 weight percent Ethylidene Norbornene (ENB).

In this embodiment, 325 grams of the premixed liquid EPDM component was mixed with 70.1 grams of deionized water and 3.0 grams of lithium 3-[(1H,1H,2H,2H-Fluoroalkyl)Thio] surfactant, which was ZONYL® FSA available from E. I. Du Pont.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 0.6 grams of sulfur curative, which was RM Sulfur from AkroChem Corporation and 0.3 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 30 weight percent solids latex was obtained with a 60 percent relative cross-linking.

Example 9

A hexane solution containing 8 weight percent solid ROYALENE® 535 polymer was the premixed liquid EPDM component. ROYALENE® 511 has a 60:40 ethylene:propylene ratio and 9.4 weight percent Ethylidene Norbornene (ENB).

In this embodiment, 625 grams of the premixed liquid EPDM component was mixed with 42.7 grams of deionized water and 6.0 grams of lithium 3-[(1H,1H,2H,2H-Fluoroalkyl)Thio] surfactant, which was ZONYL® FSA available from E. I. Du Pont.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 0.9 grams of sulfur curative, which was RM Sulfur available from AkroChem Corporation, and 0.4 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 57 weight percent solids latex was obtained with a 65 percent relative cross-linking.

Example 10

A hexane solution containing 8 weight percent solid ROYALENE® 535 polymer was the premixed liquid EPDM component. ROYALENE® 511 has a 60:40 ethylene:propylene ratio and 9.4 weight percent Ethylidene Norbornene (ENB).

In this embodiment, 875 grams of the premixed liquid EPDM component was mixed with 18.2 grams of deionized water and 10 grams of lithium 3-[(1H,1H,2H,2H-Fluoroalkyl)Thio] surfactant, which was ZONYL® FSA from E. I. Du Pont.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 82 weight percent solids latex was obtained with a 65 percent relative cross-linking.

FIG. 4 contains additional information relative to Examples 11-18.

Example 11

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 625 grams of the premixed liquid EPDM component was mixed with 46.16 grams of deionized water and 1.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 52 weight percent solids latex was obtained with an 80 percent relative cross-linking.

Following the curing process, 1.0 grams of hydroxyethyl cellulose anti-settling stabilizer, which was CELLOSIZE™ ER 30M from The Dow Chemical Company, was added to the same azeotropic distillation apparatus and refluxed at 25 degrees Celsius until a uniform latex mixture was formed. This latex has a solid content of 54 percent.

Example 12

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 625 grams of the premixed liquid EPDM component was mixed with 45.06 grams of deionized water and 1.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur available from AkroChem Corporation, and 0.56 grams of curing accelerator Tetramethylthiuram Disulfide (TMTD) available from AkroChem Corporation were added to form a partially cross-linked latex in the same azeotropic apparatus. The mixture was refluxed under partial vacuum at 74 degrees Celsius until 51 weight percent solids latex was obtained with an 80 percent relative cross-linking.

Following the curing process, 2.0 grams of hydroxyethyl cellulose anti-settling stabilizer, which was CELLOSIZE™ ER 30M from The Dow Chemical Company, and 0.1 gram of 3,5-Dimethyl-2H-1,3,5-thiadiazinane-2-thione biocide, which was PROTECTOL® DZ from BASF, were added to the same azeotropic apparatus and refluxed at 25 degrees Celsius until a uniform latex mixture was formed. This latex has a solid content of 55 percent.

Example 13

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 625 grams of the premixed liquid EPDM component was mixed with 36.15 grams of deionized water and 2.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) available from AkroChem Corporation, were added to form a partially cross-linked latex in the same azeotropic distillation apparatus. The mixture was refluxed under partial vacuum at 74 degrees Celsius until 56 weight percent solids latex was obtained with an 80 percent relative cross-linking.

Following the curing process, 5.0 grams of hydroxyethyl cellulose anti-settling stabilizer, which was CELLOSIZE™ ER 30M from The Dow Chemical Company, 5.0 grams of Talc filler, which is obtainable from CIMBAR Performance Minerals, and 0.01 gram of defoamer BYK® 021, which is Obtainable from BYK-Chemie GmbH, were added to the same azeotropic distillation apparatus and refluxed at 25 degrees Celsius until a uniform latex mixture was formed. This latex has a solid content of 64 percent.

Example 14

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 625 grams of the premixed liquid EPDM component was mixed with 10.96 grams of deionized water and 2.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 56 weight percent solids latex was obtained with an 80 percent relative cross-linking.

Following the curing process, 5.0 grams of hydroxyethyl cellulose anti-settling stabilizer, which was CELLOSIZE™ ER 30M from The Dow Chemical Company, 30 grams of silica filler, which was HI-SIL® 135 from PPG Industries, and 0.2 gram of defoamer BYK® 021, which is obtainable from BYK-Chemie GmbH, were added to the same azeotropic distillation apparatus and refluxed at 25 degrees Celsius until a uniform latex mixture was formed. This latex has a solid content of 89 percent.

Example 15

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 500 grams of the premixed liquid EPDM component was mixed with 35.66 grams of deionized water and 4.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA@ 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) from AkroChem Corporation were added to form a partially cross-linked latex in the same azeotropic distillation apparatus. The mixture was refluxed under partial vacuum at 74 degrees Celsius until 56 weight percent solids latex was obtained with an 85 percent relative cross-linking.

Following the curing process, 8.0 grams of hydroxyethyl cellulose anti-settling stabilizer, which was CELLOSIZE™ ER 30M from The Dow Chemical Company, 5.0 grams of Talc filler, which is obtainable from CIMBAR Performance Minerals, 0.5 gram of defoamer BYK® 021, which is obtainable from BYK-Chemie GmbH, and 5.0 grams of Titanium Dioxide pigment, which was TIOXIDE® TR23 from Huntsman International, LLC, were added to the same azeotropic distillation apparatus and refluxed at 25 degrees Celsius until a uniform latex mixture was formed. This latex has a solid content of 64 percent.

Example 16

A hexane solution containing 8 weight percent solid ROYALENE® 511 polymer was the premixed liquid EPDM component, ROYALENE® 511 has a 57:43 ethylene:propylene ratio and 4.6 weight percent Ethylidene Norbornene (ENB).

In this embodiment, 500 grams of the premixed liquid EPDM component was mixed with 35.66 grams of deionized water and 4.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 54 weight percent solids latex was obtained with an 85 percent relative cross-linking.

Following the curing process, 8.0 grams of hydroxyethyl cellulose anti-settling stabilizer, which was CELLOSIZE™ ER 30M from The Dow Chemical Company, 5.0 grams of Talc filler, which is obtainable from CIMBAR Performance Minerals, 0.5 gram of defoamer BYK® 021, which is obtainable from BYK-Chemie GmbH, and 5.0 grams of black pigment, which was REGAL® 300 from Cabot Corporation, were added to the same azeotropic distillation apparatus and refluxed at 25 degrees Celsius until a uniform latex mixture was formed. This latex has a solid content of 64 percent.

Example 17

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 500 grams of the premixed liquid EPDM component was mixed with 34.5 grams of deionized water and 4.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) available from AkroChem Corporation were added to form a partially cross-linked latex in the same azeotropic distillation apparatus. The mixture was refluxed under partial vacuum at 74 degrees Celsius until 44 weight percent solids latex was obtained with an 85 percent relative cross-linking.

Following the curing process, 8.0 grams of hydroxyethyl cellulose anti-settling stabilizer, which was CELLOSIZE™ ER 30M from The Dow Chemical Company, 5.0 grams of Talc filler, which is obtainable from CIMBAR Performance Minerals, 0.5 grain of defoamer BYK® 021, which is obtainable from BYK-Chemie GmbH, and 0.1 grams of red pigment, which was Synthesized Red oxide from Unilex Colours & Chemicals Limited, were added to the same azeotropic distillation apparatus and refluxed at 25 degrees Celsius until a uniform latex mixture was formed. This latex has a solid content of 59 percent.

Example 18

A hexane solution containing 8 weight percent solid ROYALENE® 511 polymer was the premixed liquid EPDM component. ROYALENE® 511 has a 57:43 ethylene:propylene ratio and 4.6 weight percent Ethylidene Norbornene (ENB).

In this embodiment, 500 grams of the premixed liquid EPDM component was mixed with 13.46 grams of deionized water and 4.0 grams of fatty amine ethoxylated salt surfactant, which was NUOSPERSE® FA 607 from Elementis Specialties.

The mixing occurred at 20,000 rpm for 1 minute using a Wiggen Hauser D-500 Shear Power Homogenizer at atmospheric pressure.

This high shear mixing was followed by repeated passes on a GEO Niro Soavi High Pressure Homogenizer known as the PANDA® 2K set at 500 bar until a uniform mixture was formed.

The uniform mixture was transferred into an azeotropic distillation apparatus equipped with a Dean-Stark apparatus to condense and trap the evaporated hexane and water.

Next, heating was employed to remove most of the hexane. The heating was performed at 62 degrees Celsius.

In this embodiment, 1.2 grams of sulfur curative, which was RM Sulfur from AkroChem Corporation, and 0.56 grams of curing accelerator Tetramethylthiuram Disulfide (TMTD) from AkroChem Corporation were added to form a partially cross-linked latex in the same azeotropic distillation apparatus. The mixture was refluxed under partial vacuum at 74 degrees Celsius until 56 weight percent solids latex was obtained with an 85 percent relative cross-linking.

Following the curing process, 8.0 grams of hydroxyethyl cellulose anti-settling stabilizer, which was CELLOSIZE™ ER 30M from The Dow Chemical Company, 0.1 gram of 3,5-Dimethyl-2H-1,3,5-thiadiazinane-2-thione biocide, which was PROTECOL® DZ from BASF, 0.5 gram of defoamer BYK® 021, which is obtainable from BYK-Chemie GmbH, 20 grams of silica filler, which was HI-SIL® 135 from PPG industries, and 1.0.0 grams of red pigment, which was Synthesized Red oxide from Unilex Colours & Chemicals Limited, were added to the same azeotropic distillation apparatus and refluxed at 25 degrees Celsius until a uniform latex mixture was formed. This latex has a solid content of 87 percent.

While these embodiments have been described with emphasis on the embodiments, it should be understood that within the scope of the appended claims, the embodiments might be practiced other than as specifically described herein.

What is claimed is:

1. A cross-linked ethylene propylene diene terpolymer latex with a solids content from 30 weight percent to 60 weight percent based on the total weight of the cross-linked ethylene propylene diene terpolymer latex, the cross-linked ethylene propylene diene terpolymer latex comprising:
   a. 15 weight percent to 88 weight percent of a premixed liquid ethylene propylene diene terpolymer component in 50 weight percent to 96 weight percent of a solvent, wherein the premixed liquid ethylene propylene diene terpolymer component has a molecular weight from 1300000 Mw to 5000 Mw, and consists of:
  (i) 4 weight percent to 50 weight percent of random covalently linked monomers of ethylene and propylene having weight ratios from 40:60 to 85:15 of ethylene:propylene respectively; and
  (ii) 0.25 weight percent to 15 weight percent of the polymer component is a non-conjugated diene;
b. 10 weight percent to 70 weight percent of a water, wherein the water is selected from the group consisting of: distilled water, deionized water, tap water, process water, and combinations thereof;
c. 1 weight percent to 30 weight percent of a surfactant; and
d. at least a portion of at least one of: a sulfur donative curative and a free radical generating curative, wherein the portion is within a weight percent from 0.3 weight percent to 1.76 weight percent of a total amount of curative used in the formulation, thereby forming a cross-linked ethylene propylene diene terpolymer miscible with acrylic, urethane, alkyd, and epoxy lattices; and
  wherein upon heating the cross-linked ethylene propylene diene terpolymer, the cross-linked ethylene propylene diene terpolymer further cross-links and if the formulation has a cross-link density less than 50 percent when at least 99 percent of the water is removed from the cross-linked ethylene propylene diene terpolymer latex as determined by ASTM test D 3616 effective 2014, adding an additional portion of curative and heating a second time forming a dehydrated cross-linked ethylene propylene diene terpolymer latex which when applied to a substrate, the cross-linked ethylene propylene diene terpolymer latex exhibits: a glass transition temperature of −50 degrees Celsius to −40 degrees Celsius; an impact resistance as measured by a falling dart test that has less than a 50 percent failure at 20 inch-pound at an ambient temperature; a moisture barrier of less than 1.0 perm unit as determined by ASTM D 1735 effective 2014 preventing penetration of water to a substrate; and a color change of delta E of less than 5 as measured by the accelerated weathering tests ASTM G 154 and ASTM D 3632 both with effective dates of 2014.

2. The cross-linked ethylene propylene diene terpolymer latex of claim 1, further comprising from 1 weight percent to 10 weight percent of an anti-settling stabilizer.

3. The cross-linked ethylene propylene diene terpolymer latex of claim 1, further comprising from 0.1 weight percent to 0.2 weight percent of a biocide.

4. The cross-linked ethylene propylene diene terpolymer latex of claim 1, further comprising from 5 weight percent to 30 weight percent of a filler.

5. The cross-linked ethylene propylene diene terpolymer latex of claim 1, comprising from 0.1 weight percent to 20 weight percent of a pigment.

6. The cross-linked ethylene propylene diene terpolymer latex of claim 1, wherein the non-conjugated diene comprises at least one of: methylidene norbornene, dicyclopentadiene, ethylidene norbornene, and 1,4-hexadiene, vinyl norbornene.

7. The cross-linked ethylene propylene diene terpolymer latex of claim 1, wherein the solvent is at least one of: hexane, xylenes, naphtha, isopar, mineral spirits, toluene, and further wherein the solvent is used in conjunction with another hydrocarbon solvent capable of dissolving ethylene propylene diene terpolymer.

8. The cross-linked ethylene propylene diene terpolymer latex of claim 1, wherein the preset limit for the crosslink density is 30 percent of the terpolymer.

9. The cross-linked ethylene propylene diene terpolymer latex of claim 1, comprising 0.01 to 0.5 weight percent of a defoaming agent.

10. A coating consisting of the formulation of claim 1 for raincoats, tents, tarps, chemical plant roofs, chemical plant walls, storage tank exteriors, exteriors of transportation vehicles, and conveyor belts.

11. Disposable soft molded gloves for chemical resistant applications made from the formulation of claim 1.

12. An adhesive made comprising 50 to 80 weight percent of the formulation of claim 1.

13. The cross-linked ethylene propylene diene terpolymer latex of claim 1, wherein the surfactant is selected from the group consisting of: a tetra-octyl ammonium chloride, a sulfo-succinate, a carboxylate, a polyoxyethylene sorbate, cetyl ammonium chloride, a sodium alkyl benzyl sulfonate, a sodium lauryl sulfate, a potassium lauryl sulfate, an ammonium lauryl sulfate, a rosin acid, a tallow fatty acid, a polyethylene stearyl ether, a perfluoro butane sulfonic acid, an alkyl naphthalene sulfonate, or combinations thereof.

14. The cross-linked ethylene propylene diene terpolymer latex of claim 1, wherein the sulfur donative curative if used and the free radical generating curative if used are each selected from the group consisting of: a peroxide, a hydroperoxide, a peroxy-carbonate, a thiuram, a thiazole, a dithiocarbamate, a xanthate, a sulfenamide, a sulfur, a phenolic resin, a benzothiazole, and combinations thereof.

15. The cross-linked ethylene propylene diene terpolymer latex of claim 2, wherein the anti-settling stabilizer is selected from the group consisting of: a hydroxyethyl cellulose, a glycerin, a hydrophobically modified soluble acrylic emulsion, a polyether urea polyurethane, a polyester of glycerin and an isophthalic acid or a linoleic acid, and combinations thereof.

16. The cross-linked ethylene propylene diene terpolymer latex of claim 3, wherein the biocide is selected from the group consisting of: a benzisothiazolinone, a 3,5-Dimethyl-2H-1,3,5-thiadiazinane-2-thione biocide, a 4,5 dichloro-2-n-octyl-isothazonline-3-one, or combinations thereof.

17. The cross-linked ethylene propylene diene terpolymer latex of claim 4, wherein the filler is selected from the group consisting of: a silica, a talc, a starch, a carbon black, or combinations thereof.

18. The cross-linked ethylene propylene diene terpolymer latex of claim 5, wherein the pigment is selected from the group consisting of: a dye, a carbon black, and a metal oxide.

19. The cross-linked ethylene propylene diene terpolymer latex of claim 9, wherein the defoaming agent is selected from the group consisting of: a polydimethyl siloxane, a polydimethly siloxane with finely divided silica, a petroleum distillate based agent, or combinations thereof.

* * * * *